United States Patent
Liao et al.

(10) Patent No.: US 8,831,079 B2
(45) Date of Patent: Sep. 9, 2014

(54) APPARATUS AND METHOD FOR DETECTING SYMBOL RATE

(75) Inventors: Yi-Ying Liao, Hsinchu County (TW); Tung-Sheng Lin, Hsinchu County (TW); Tai-Lai Tung, Hsinchu County (TW)

(73) Assignee: Mstar Semiconductor, Inc., Hsinchu County (TW)

( * ) Notice: Subject to any disclaimer, the term of this patent is extended or adjusted under 35 U.S.C. 154(b) by 62 days.

(21) Appl. No.: 13/565,987

(22) Filed: Aug. 3, 2012

(65) Prior Publication Data

US 2013/0215950 A1    Aug. 22, 2013

(30) Foreign Application Priority Data

Feb. 16, 2012  (TW) ............................. 101105125 A (51) Int. Cl.
*H04B 3/46*   (2006.01)
(52) U.S. Cl.
USPC .............. 375/225; 342/175; 375/344; 455/71

(58) Field of Classification Search
None
See application file for complete search history.

(56) References Cited

U.S. PATENT DOCUMENTS

2010/0272208 A1*  10/2010  Feigin et al. ................... 375/268
2011/0135042 A1*   6/2011  Tseng et al. ................... 375/344

* cited by examiner

*Primary Examiner* — Adolf Dsouza
(74) *Attorney, Agent, or Firm* — WPAT, PC; Justin King (57) ABSTRACT

A symbol rate detection apparatus includes an analog-to-digital converter (ADC), a coarse detection module, a mixer, a down-sampling module, and a fine detection module. The ADC converts an analog input signal to a digital input signal at an original sampling frequency. The coarse detection module estimates a carrier frequency offset and a coarse symbol rate according to the digital input signal. The mixer adjusts the frequency of the digital input signal according to the carrier frequency offset to generate a frequency-compensated signal. The fine detection module determines a fine symbol rate according to the frequency-compensated signal.

19 Claims, 7 Drawing Sheets

APPARATUS AND METHOD FOR DETECTING SYMBOL RATE

This application claims the benefit of Taiwan application Serial No. 101105125, filed Feb. 16, 2012, the subject matter of which is incorporated herein by reference in its entirety.

BACKGROUND OF THE INVENTION

1. Field of the Invention

The invention relates in general to a digital television broadcasting technique, and more particularly, to a technique for determining a symbol rate of a digital television signal.

2. Description of the Related Art

With advancements in communication techniques, digital television broadcasting gradually matures. Apart from being transmitted via cables, digital television signals can also be transmitted in wireless signals via a base station or a satellite. The Digital Video Broadcasting-Satellite (DVB-S) and the Digital Video Broadcasting-Satellite-Second Generation (DVB-S2) are prevalent standards in digital television broadcasting.

The symbol rate is the number of symbol changes (waveform changes or signaling events) made to a transmission medium every second with a digitally modulated signal. In both DVB-S and DVB-S2 specifications, a symbol rate of digital television signals is an arbitrary value between 0 to 45 MHz, which means the symbol rate can be any value in a rather wide range. Since a receiver cannot be informed of a carrier channel and a symbol rate selected at the transmitter in advance, the receiver must scan all channels and the entire symbol rate range to correctly decode and restore a received signal. However, the sequential scanning toward all parameter combinations by the receiver is extremely time consuming, and such approach is far from an ideal solution from both efficiency and performance perspectives.

SUMMARY OF THE INVENTION

To satisfy requirements for determining a symbol rate in a digital television broadcasting system, the invention is directed to an apparatus and method for detecting a symbol rate, which is capable of not only identifying a symbol rate of a currently received television broadcasting signal but also determining whether the television broadcasting signal is valid.

According to one embodiment of the present invention, a symbol rate detection apparatus is provided. The apparatus comprises an analog-to-digital converter (ADC), a coarse detection module, a mixer, a down-sampling module, and a fine detection module. The ADC converts an analog input signal to a digital input signal at an original sampling frequency. The coarse detection module estimates a carrier frequency offset and a coarse symbol rate according to the digital input signal. The mixer adjusts the frequency of the digital input signal according to the carrier frequency offset to generate a frequency-compensated signal. The fine detection module determines a fine symbol rate according to the frequency-compensated signal.

According to another embodiment of the present invention, a symbol rate detecting method is provided. The method comprises steps of: sampling an analog input signal at an original sampling frequency to generate a digital input signal; estimating a carrier frequency offset and a coarse symbol rate according to the digital input signal; adjusting a frequency of the digital input signal according to the carrier frequency offset to generate a frequency-compensated signal; and determining a fine symbol rate according to the frequency-compensated frequency.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 4 is a block diagram of a symbol rate detection apparatus further comprising a low-pass filter according to one embodiment of the present invention.

FIGS. 5 to 7 are flowcharts of a symbol rate detecting method according to embodiments of the present invention.

DETAILED DESCRIPTION OF THE INVENTION

Figure 1:
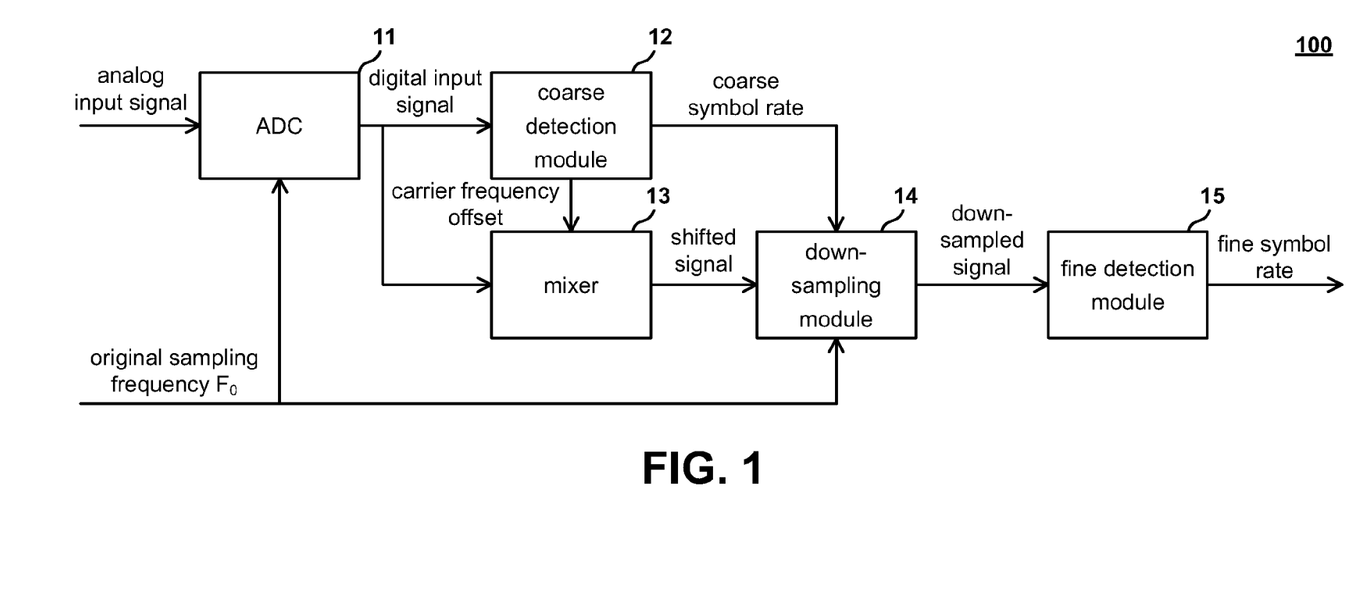
FIG. 1 is a block diagram of a symbol rate detection apparatus according to one embodiment of the present invention.

FIG. 1 shows a symbol rate detection apparatus 100 according to one embodiment of the present invention. The symbol rate detection apparatus 100 comprises an analog-to-digital converter (ADC) 11, a coarse detection module 12, a mixer 13, a down-sampling module 14, and a fine detection module 15. In practice, the symbol rate detection apparatus 100 may be integrated into a DVB-S or DVB-S2 compliant digital television signal receiver.

The ADC 11 receives an analog signal, and converts the analog input signal to a digital input signal at an original sampling frequency $F_O$. As previously stated, a symbol rate of a digital television signal may range anywhere from 0 to 45 MHz. It is beneficial to have high sampling rates for quality analog to digital conversion, especially when compared to the symbol rate. For example, the original sampling frequency may be 96 MHz, which is slightly higher than twice of the maximum symbol rate.

Figure 2A:
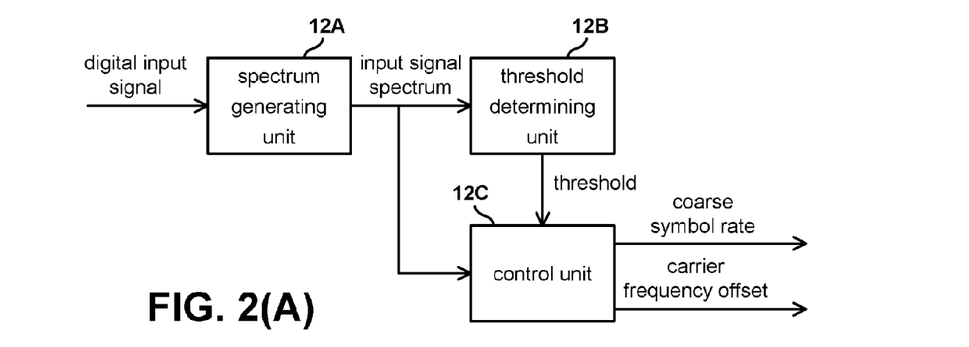
FIG. 2A is a detailed diagram of a coarse detection module according to one embodiment of the present invention.
Figure 2B:
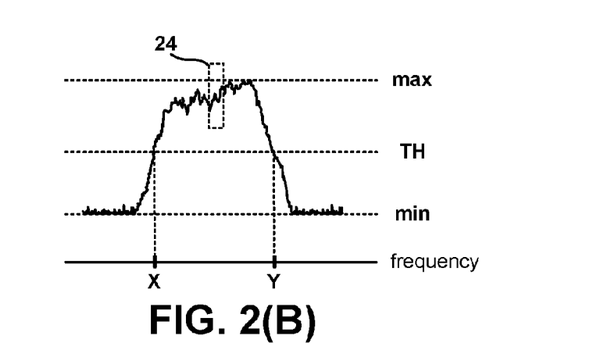
FIG. 2B is an example of an input signal.

The coarse detection module 12 estimates a carrier frequency offset CFO and a coarse symbol rate $SR_C$ according to the digital input signal generated by the ADC 11. FIG. 2A shows a detailed block diagram of the coarse detection module 12 according to one embodiment. In this embodiment, the coarse detection module 12 comprises a spectrum generating unit 12A, a threshold determining unit 12B, and a control unit 12C. The spectrum generating unit 12A analyzes the digital input signal to generate an input signal spectrum. In practice, the spectrum generating unit 12A divides the digital input signal into a plurality of segments (e.g., 32 segments or 64 segments), performs a Fast Fourier Transform (FFT) on the segments, respectively, and superposes square values of energies of all transformed results. Numbers of computing points of FFT in the segments are identical, and are associated with a calculation of the subsequent carrier frequency offset CFO. FIG. 2B is a plot of a superposed result.

The threshold determining unit 12B determines a maximum energy max and a minimum energy min in the input signal spectrum, and determines a threshold TH accordingly.

For example, the threshold can be an average of the maximum energy max and the minimum energy min. The maximum energy min, the minimum energy min, and the threshold TH are also depicted in FIG. 2B. In an ideal noise-free condition, the minimum energy min is substantially zero, and the threshold TH is exactly half of the maximum energy max. In an ideal condition, when the input signal spectrum is expressed in a unit of decibels (dB), the threshold TH is located at approximately 3 dB below the maximum energy max.

In one embodiment, a neighboring direct-current (DC) range (e.g., a region 24 indicated by a dotted frame in FIG. 2B) of the input signal spectrum can be ignored when the threshold determining unit 12B determines the maximum energy max, so as to prevent the threshold determining unit 12B from misjudging the maximum energy max due to an abnormal DC component occurred in the region.

The threshold determining unit 12B provides the threshold TH to the control unit 12C for reference. The control unit 12C determines the carrier frequency offset CFO and the coarse symbol rate $SR_C$ according to two intersections X and Y that the input signal spectrum and the threshold TH have. In one embodiment, the control unit 12C generates the carrier frequency offset CFO by subtracting a central frequency from a frequency average of the two intersections X and Y, and provides the coarse symbol rate $SR_C$ by frequency difference between the two intersections X and Y. The central frequency is determined to be half of the computing points of the foregoing FFT.

Figure 2C:
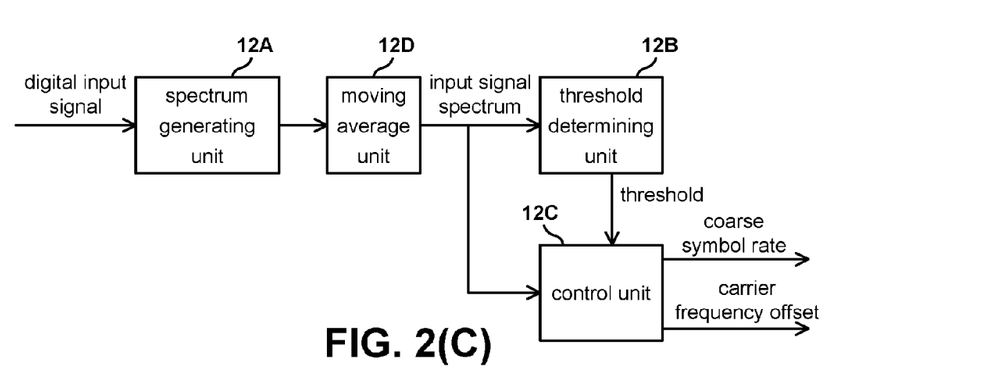
FIG. 2C is a block diagram of a coarse detection module comprising a moving average unit according to one embodiment of the present invention.

Referring to FIG. 2C, in one embodiment, the coarse detection module 12 further comprises a moving average unit 12D. Before the threshold determining unit 12B determines the maximum energy max and the minimum energy min, the moving average unit 12D performs at least one moving average on the input signal spectrum, so as to smooth the input signal spectrum and to minimize misjudgments caused by noise.

In one embodiment, to adapt to different requirements, the moving average unit 12D performs multiple moving averages with different parameters on the input signal spectrum. For example, the moving average unit 12D performs first moving average on the input signal spectrum to generate a first smooth spectrum, which is provided to the threshold determining unit 12 for determining the maximum energy. The moving average unit 12D also performs second moving average on the input signal spectrum to generate a second smooth spectrum, which is provided to the threshold determining unit 12B for determining the minimum energy. The moving average unit 12D further performs third moving average on the input signal spectrum to generate a third smooth spectrum, which is provided to the control unit 12C for determining the frequencies at the intersections X and Y. The above three moving averages adopt different average ranges. For example, a greater average range is adopted for determining the maximum energy and the minimum energy to obtain a more accurate value, whereas a smaller average range is adopted for determining the intersections. It should be noted that, a large average range may affect positions of the intersections when the symbol rate is small. In addition, the average range for determining the maximum energy is in principle smaller than the average range for determining the minimum energy since the average range for determining the maximum energy should not be greater than the symbol rate.

Furthermore, the threshold determining unit 12B may also determine whether the analog input signal is valid (i.e., a correct signal) according to a difference of the maximum energy max and the minimum energy min. For example, when a ratio of the maximum energy max to the minimum energy min is smaller than a predetermined value, it means that the analog input signal currently received by the symbol rate detection apparatus 100 may not be a correct digital television signal. For an invalid analog input signal, it is configured that the control unit 12C no longer determines the carrier frequency offset CFO and the coarse $SR_C$, so as to prevent unnecessary power consumption. In practice, when the current analog input signal is determined to be invalid, the symbol rate detection apparatus 100 may prompt a front-end radio-frequency circuit to receive signals from another channel.

The mixer 13 adjusts the frequency of the digital input signal according to the carrier frequency offset CFO generated by the coarse detecting module 12 to generate a frequency-compensated signal. More specifically, a central frequency of the digital input signal is adjusted to match a predetermined central processing frequency (e.g., a DC band having a central frequency of zero) of subsequent down-sampling circuit and filter.

In this embodiment, the down-sampling circuit 14 determines a down-sampling ratio d according to the coarse symbol rate $SR_C$ and the original sampling frequency $F_0$, and down-samples the shifted signal according to the down-sampling ratio d to generate a down-sampled signal. The fine detection module 15 determines a fine symbol rate $SR_F$ according to the down-sampled signal. One of the reasons for the down-sampling is as follows. Since a range of the desired symbol rate is quite large (e.g., 0 to 45 MHz in DVB-S and DVB-S2), a FFT unit with a large number of computing points is required. However, the large number of computing points of the FFT unit equals high costs, and thus an optional approach to reduce the cost is to perform down-sampling to allow a FFT unit with moderate number of computing points to calculate signals of all symbol rates.

The down-sampling module 14 of the present invention determines a down-sampling frequency $F_D$ according to the coarse symbol rate $SR_C$ and the original sampling frequency $F_0$. In one embodiment, the down-sampling module 14 determines the down-sampling ratio d according to the equation below:

$$d = \frac{F_0}{F_D} = \frac{F_0}{SR_C \times m}$$

Where $F_0$ represents the original sampling rate, $SR_C$ represents the coarse symbol rate, and m represents a sampling ratio. Preferably, the sampling ratio is between 2 and 4, e.g., 2.5. More specifically, a lower limit of the down-sampling frequency $F_D$ is set as twice of the coarse symbol rate $SR_C$. Given that the sampling theorem is fulfilled, a smallest possible sampling ratio m is preferred. According to the above principles, the down-sampling module 14 determines the down-sampling ratio d and the down-sampling frequency $F_D$ to hence down-sample the shifted signal. In practice, the down-sampling module 14 may be implemented by a four-level anti-aliasing filter. The down-sampling module 14 may select a most approximate value from integer powers of 2, such as 1, 2, 4, 8, and 16, as the down-sampling ratio d.

Figure 3A:
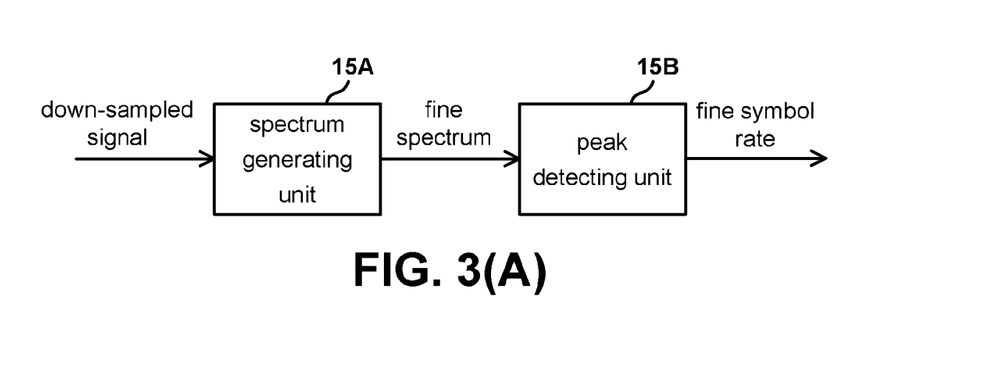
FIG. 3A is a detailed block diagram of a fine detection module according to one embodiment of the present invention.
Figure 3B:
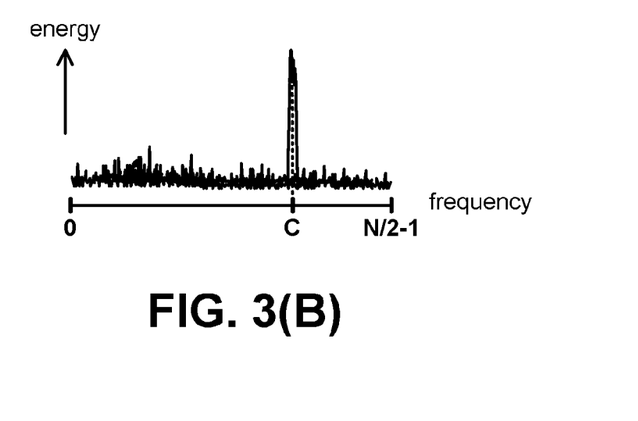
FIG. 3B is an example of a fine spectrum.

Referring to FIG. 3A, in one embodiment, the fine detection module 15 comprises a spectrum generating unit 15A and a peak detecting unit 15B. The spectrum generating unit 15A performs the FFT on absolute square values of the down-sampled signals to generate a fine spectrum. In practice, the spectrum generating unit 15A may perform the FFT on the absolute square values of the down-sampled signals, and generate the fine spectrum according to absolute square values of transform results. The peak detecting unit 15B determines a peak in the fine spectrum, and determines the fine symbol rate $SR_F$ according to the peak. FIG. 3B shows an example of a fine spectrum.

In practice, before the spectrum generating unit 15A performs the FFT, a DC offset in the absolute square value of the signal may be estimated and removed to prevent an overflow during a calculation process. Further, the peak detecting unit 15B may also eliminate the DC band when identifying the spectrum peak to prevent misjudgment.

Assume that there are N numbers of the computing points of the FFT performed by the spectrum generating unit 15A, the peak corresponds to a horizontal-axis coordinate C, and the sampling frequency corresponding to the down-sampling signal is $F_D$. The horizontal-axis coordinate of the spectrum is from 0 to (N−1). After determining the horizontal-axis coordinate C, the peak detecting unit 15B calculates the fine symbol rate $SR_F$ according the equation below:

$$SR_F = \frac{C}{N} \times F_D$$

An accuracy of the fine symbol rate $SR_F$ is limited by the FFT computing points number N. As the computing points number N gets larger, the fine symbol rate $SR_F$ calculated by the peak detecting unit 15B becomes more accurate, and a hardware cost of the spectrum generating unit 15A however rises accordingly.

Although the fine symbol rate $SR_F$ is an unknown value when the peak detecting unit 15B performs the above calculation, the fine symbol rate $SR_F$ is in fact a fixed value. It is seen from the above equation that, provided that the computing points number N stays constant, the coordinate C becomes larger as the down-sampling frequency $F_D$ gets smaller. For example, assuming the down-sampling frequency $F_D$ is 24 MHz, the horizontal-axis coordinate of the peak in the fine spectrum occurs at value 201 (i.e., C=201). It is deduced that, assuming the down-sampling frequency $F_D$ is 48 MHz, the peak is expected to occur at value 100 on horizontal-axis. Since the horizontal-axis coordinate of the fine spectrum is usually an integer (the horizontal-axis C identified by the peak detecting unit 15B does not contain a decimal), the accuracy of the peak gets higher when the down-sampling frequency $F_D$ is lower. In other words, without increasing the computing points number N, a more accurate fine symbol rate $SR_F$ can still be obtained by appropriately selecting a lower down-sampling frequency $F_D$.

Referring to FIG. 4, in another embodiment, the symbol rate detection apparatus 100 further comprises a low-pass filter 16. The low-pass filter 16 is coupled between the down-sampling module 14 and the fine detection module 15, and is for removing high-frequency noises in the down-sampled signal. In practice, the coarse symbol rate $SR_C$ generated by the coarse detection module 12 may also be provided to the low-pass filter 16, so as to set the parameters in the low-pass filter 16 and to obtain least interferences from the neighboring band and noises.

The spectrum generating unit 12A and the spectrum generating unit 15A may be integrated in one device. That is, the coarse detection module 12 and the fine detection module 15 may share the same hardware for generating a spectrum.

FIG. 5 shows a flowchart of a symbol rate detecting method according to one embodiment of the present invention. Referring to FIG. 5, in Step S51, an analog input signal is converted to a digital input signal at an original sampling frequency. In Step S52, a carrier frequency offset and a coarse symbol rate are estimated according to the digital input signal. In Step S53, a frequency of the digital input signal is adjusted according to the carrier frequency offset to generate a shifted signal. In Step 54, a down-sampling ratio is determined according to the coarse symbol rate and the original sampling frequency. In Step S55, the shifted signal is down-sampled according to the down-sampling ratio to generate a down-sampled signal. In Step S56, a fine symbol rate is determined according to the down-sampled signal.

Figure 6:
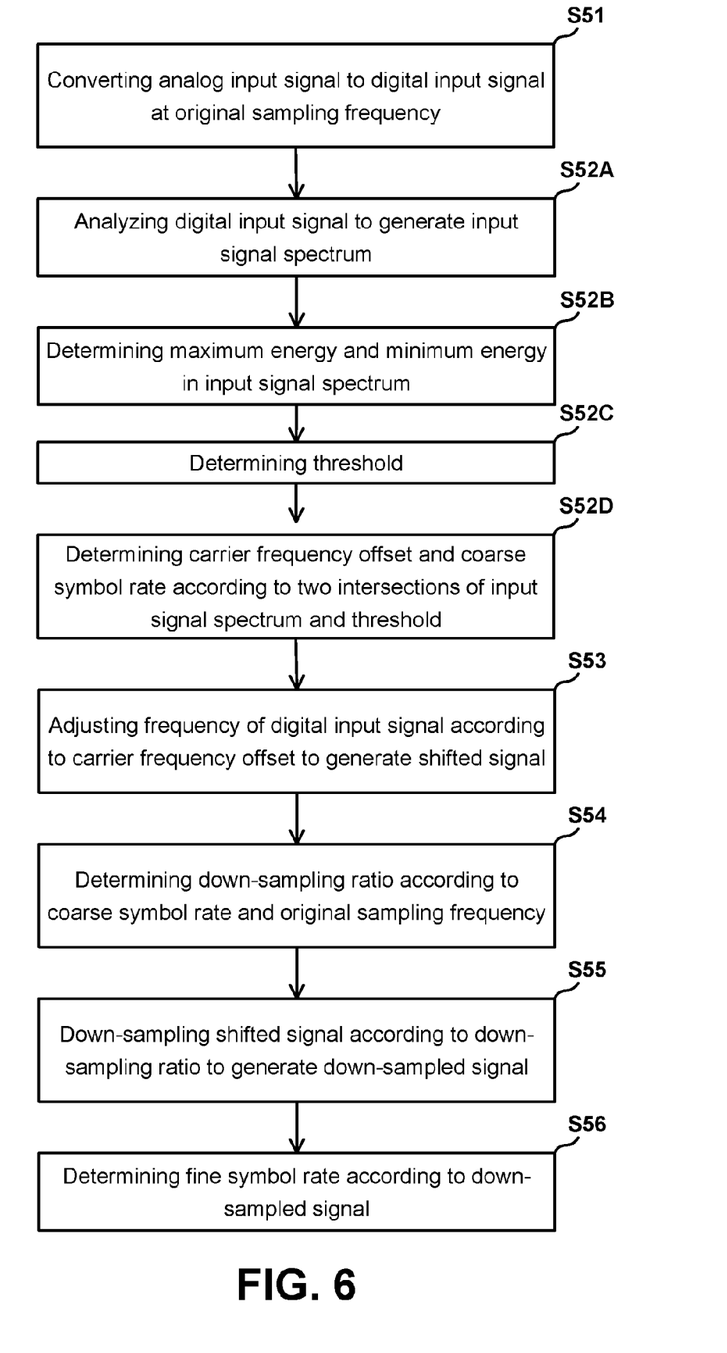

As shown in FIG. 6, Step S52 includes four sub-steps. In Step S52A, the digital input signal is analyzed to generate an input signal spectrum. In Step S52B, a maximum energy and a minimum energy in the input signal spectrum are determined. In Step S52C, a threshold is determined according to the maximum energy and the minimum energy. In Step S52D, the carrier frequency offset and the coarse symbol rate are determined according to two intersections of the input signal spectrum and the threshold.

Figure 7:
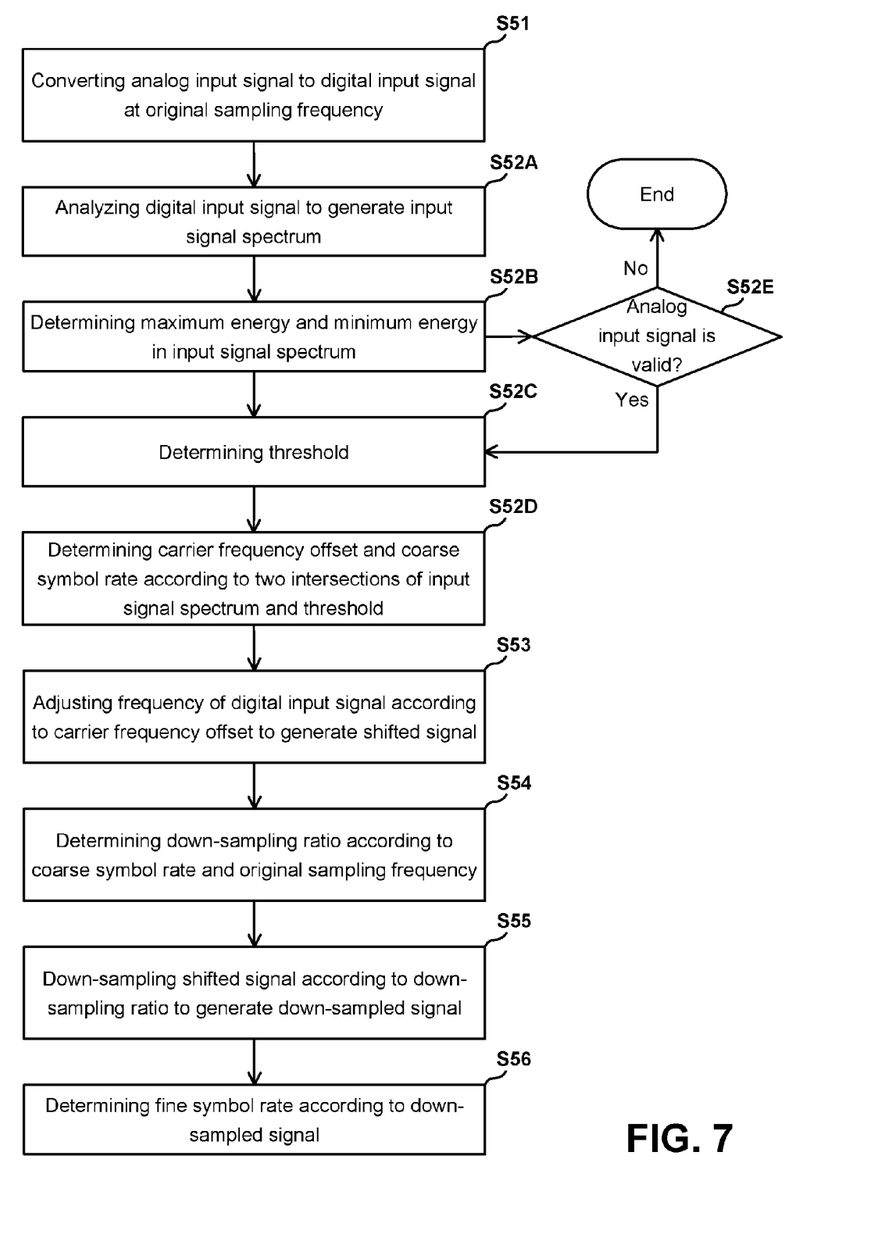

As shown in FIG. 7, Step S52 may further include a determining step S52E, in which it is determined whether the analog input signal is valid according to a difference of the maximum energy and the minimum energy. When a determination result of Step S52E is negative, the process ends. Conversely, when the determination result of Step S53E is affirmative, subsequent steps are performed.

It should be noted that, the modifications in related descriptions of the symbol rate detection apparatus 100 may also be applied to the symbol rate detecting method in FIGS. 5, 6, and 7, and details thereof shall be omitted herein for the sake of brevity.

Therefore, to satisfy requirements for determining a symbol rate in a digital television broadcasting system, the described symbol rate detection apparatus and method is provided. The described apparatus and method can identify a symbol rate of a currently received television broadcasting signal, in addition to determining whether the television broadcasting signal is valid.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for detecting a symbol rate, comprising:
   an analog-to-digital converter (ADC), for receiving an analog input signal, and sampling the analog input signal at an original sampling frequency to generate a digital input signal;
   a coarse detection module, for receiving the digital input signal, and estimating a carrier frequency offset according to the digital input signal;
   a mixer, coupled to the coarse detection module and the ADC, for adjusting a frequency of the digital input signal according to the carrier frequency offset to generate a frequency-compensated signal; and
   a fine detection module, for determining a fine symbol rate according to the frequency-compensated signal;
   wherein the coarse detection module comprises:
   a spectrum generating unit, for analyzing the digital input signal to generate an input signal spectrum;
   a threshold determining unit, for determining a maximum energy and a minimum energy in the input signal spectrum, and determining threshold according to the maximum energy and the minimum energy; and a control unit, for determining the carrier frequency offset and the coarse symbol rate according to a plurality of intersections of the input signal spectrum and the threshold;

wherein the threshold is an average of the maximum energy and the minimum energy, a difference between an average frequency of two of the intersections and a central frequency is the carrier frequency offset, and a frequency difference of the two intersections is the coarse symbol rate.

2. The apparatus according to claim 1, wherein the coarse detection module further estimates a coarse symbol rate according to the digital input signal, the apparatus further comprises:

a down-sampling module, for determining a down-sampling ratio according to the coarse symbol rate and the original sampling frequency, down-sampling the frequency-compensated signal according to the down-sampling ratio to generate a down-sampled signal and update the frequency-compensated signal, and providing the updated frequency-compensated signal to the fine detection module;

wherein, the down-sampling module determines the down-sampling ratio according to a following equation:

$$d = \frac{F_0}{SR_C \times m},$$

where d represents the down-sampling ratio, $F_0$ represents the original sampling frequency, $SR_C$ represents the coarse symbol rate, and m represents a predetermined sampling ratio.

3. The apparatus according to claim 2, wherein the predetermined sampling ratio ranges between 2 and 4.

4. The apparatus according to claim 2, further comprising:

a low-pass filter, coupled between the down-sampling module and the fine detection module, for filtering out a high-frequency noise in the down-sampled signal.

5. The apparatus according to claim 2, wherein the down-sampling module comprises a four-level anti-aliasing filter.

6. The apparatus according to claim 2, wherein the fine detection module comprises:

a spectrum generating unit, for analyzing the down-sampled signal to generate a fine spectrum; and a peak detecting unit, for determining a peak in the fine spectrum and determining the fine symbol rate according to the peak.

7. The apparatus according to claim 1, wherein the threshold determining unit only takes a part of the input signal spectrum into account when determining the maximum energy and the minimum energy.

8. The apparatus according to claim 1, wherein the coarse detection module further comprises:

a moving average unit, for performing at least one moving average on the input signal spectrum to smooth the input signal spectrum, before the threshold determining unit determines the maximum energy and the minimum energy.

9. The apparatus according to claim 8, wherein the moving average unit performs first moving average on the input signal spectrum to generate a first smooth spectrum, which is provided to the threshold determining unit for determining the maximum energy; the moving average unit further performs second moving average on the input signal spectrum to generate a second smooth spectrum, which is provided to the threshold determining unit for determining the minimum energy; the moving average unit further performs third moving average on the input signal spectrum to generate a third smooth spectrum, which is provided to the control unit to determine the intersections; the first moving average, the second moving average and the third moving average have different average ranges.

10. The apparatus according to claim 1, wherein the threshold determining unit further determines whether the analog input signal is valid according to a difference between the maximum energy and the minimum energy, and the control unit stops determining the carrier frequency offset and the coarse symbol rate when the analog input signal is not valid.

11. A method for detecting a symbol rate, comprising:

a) sampling an analog input signal at an original sampling frequency to generate a digital input signal;

b) estimating a carrier frequency offset according to the digital input signal comprising;

analyzing the digital input signal to generate an input signal spectrum;

determining a maximum energy and a minimum energy in the input signal spectrum, and determining a threshold according to the maximum energy and the minimum energy; and determining the carrier frequency offset and the coarse symbol rate according to a plurality of intersections of the input signal spectrum and the threshold;

wherein the threshold is an average of the maximum energy and the minimum energy, a difference between an average frequency of two of the intersections and a central frequency is the carrier frequency offset, and a frequency difference of the two intersections is the coarse symbol rate;

c) adjusting a frequency of the digital input signal according to the carrier frequency offset to generate a frequency-compensated signal; and d) determining a fine symbol rate according to the frequency-compensated signal.

12. The method according to claim 11, wherein the step of estimating a carrier frequency offset further comprising estimating a coarse symbol rate according to the digital input signal, between adjusting a frequency of the digital input signal and determining a fine symbol rate, the method further comprising:

determining a down-sampling ratio according to the coarse symbol rate and the original sampling frequency, and down-sampling the frequency-compensated signal according to the down-sampling ratio to update the frequency-compensated signal;

wherein, the down-sampling ratio is determined according to a following equation:

$$d = \frac{F_0}{SR_C \times m},$$

where d represents the down-sampling ratio, $F_0$ represents the original sampling frequency, $SR_C$ represents the coarse symbol rate, and m represents a predetermined sampling ratio.

13. The method according to claim 12, wherein the predetermined sampling ratio ranges between 2 and 4.

14. The method according to claim 11, wherein only a part of the input signal spectrum is taken into account when determining the maximum energy and the minimum energy.

15. The method according to claim 11, wherein between generating an input signal spectrum and determining a maximum energy and a minimum energy in the input signal spectrum, the method further comprises:
- performing at least one moving average on the input signal spectrum to smooth the input signal spectrum.

16. The method according to claim 15, wherein performing at least one moving average on the input signal spectrum to smooth the input signal spectrum further comprises:
- performing first moving average on the input signal spectrum to generate a first smooth spectrum for determining the maximum energy in the input signal spectrum;
- performing second moving average on the input signal spectrum to generate a second smooth spectrum for determining the minimum energy in the input signal spectrum; and
- performing third moving average on the input signal spectrum to generate a third smooth spectrum for determining the intersections when determining the carrier frequency offset and the coarse symbol rate;
- wherein, average ranges adopted by the first moving average, the second moving average, and the third moving average have different average ranges.

17. The method according to claim 11, further comprising:
- determining whether the analog input signal is valid according to a difference between the maximum energy and the minimum energy.

18. The method according to claim 11, further comprising:
- filtering out a high-frequency noise in the down-sampled signal by a low-pass filter procedure.

19. The method according to claim 11, wherein determining a fine symbol rate further comprises:
- analyzing the down-sampled signal to generate a fine spectrum; and
- determining a peak in the fine spectrum, and determining the fine symbol rate according to the peak.

* * * * *